Dec. 27, 1966 H. NAARMANN ET AL 3,294,754
ETHYLENE COPOLYMERS AND PROCESS FOR PRODUCTION THEREOF
Filed Sept. 21, 1962
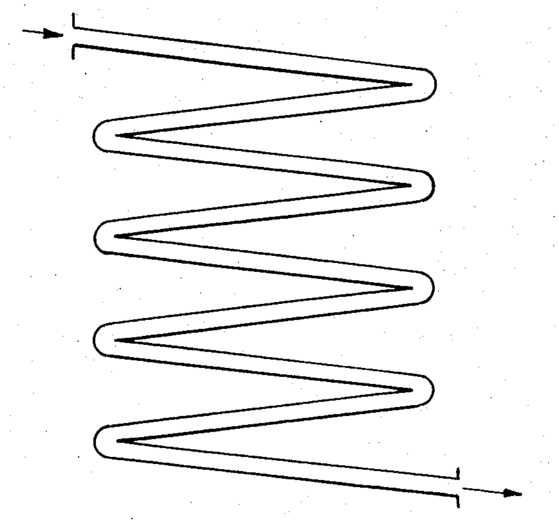
INVENTORS:
HERBERT NAARMANN
ERNST-GUENTHER KASTNING
GERD SCHROEDER
BY
Marzall, Johnston, Cook & Root
ATT'YS 3,294,754

ETHYLENE COPOLYMERS AND PROCESS FOR PRODUCTION THEREOF

Herbert Naarmann, Ludwigshafen (Rhine), Ernst-Guenther Kastning, Assenheim, and Gerd Schroeder, Ludwigshafen (Rhine), Germany, assignors to Badische Anilin- & Soda-Fabrik Aktiengesellschaft, Ludwigshafen (Rhine), Germany Filed Sept. 21, 1962, Ser. No. 225,230
Claims priority, application Germany, Sept. 22, 1961, B 64,098
3 Claims. (Cl. 260—78)

This invention relates to copolymers of ethylene with polymerizable carboxylic acid amides, which are ethylenically unsaturated in the $\alpha,\beta$-position to the carboxylic amide group, and a method of producing such copolymers.

It is known that ethylene can be polymerized with polymerizable ethylenically unsaturated compounds such as esters and amides of acrylic and methacrylic acid, employing radical-forming catalysts, elevated pressures, and temperatures between 50 and 200° C. In the known methods for producing such copolymers, the ethylene is allowed to act upon the ethylenically unsaturated compounds, which may if desired by diluted with a solvent such as water or dispersed in such solvents, in bulk. If acrylamides or methacrylamides are employed, however, mixtures of copolymers, homopolymers, and partially cross-linked polymers are obtained.

It is an object of this invention to provide an improved method of producing copolymers from ethylene and carboxylic amides ethylenically unsaturated in the $\alpha,\beta$-position, such copolymers being practically free from homopolymers of the monomers employed and free from cross-linked components of the copolymers. A further object of the invention is to provide a method of producing copolymers from ethylene and carboxylic amides which are ethylenically unsaturated in the $\alpha,\beta$-position, according to which copolymers with waxy properties are obtained which can be emulsified in water with the addition of conventional emulsifying agents. Yet another object of the invention is to provide copolymers of ethylene and carboxylic amides ethylenically unsaturated in the $\alpha,\beta$-position, which have waxy properies and can be cross-linked. Further objects and advantages will become apparent from the following detailed description.

We have found that ethylene can with advantage be copolymerized with polymerizable ethylenically unsaturated compounds that are not in gaseous form under the conditions of polymerization, in the presence of free radical forming catalysts at elevated pressure and temperatures between 50 and 200° C., preferably between 70 and 150° C., by using as polymerizable ethylenically unsaturated compound at least 1% by weight, calculated on the total amount of polymerizing monomers, of a carboxylic amide ethylenically unsaturated in the $\alpha,\beta$-position to the carboxylic amide group and if desired substituted on the nitrogen atom of the amide group, and allowing the ethylene to act upon a thin layer of the polymerizable ethylenically unsaturated compound, catalyst, and solvent, if any.

As carboxylic amides ethylenically unsaturated in the $\alpha,\beta$-position, amides of carboxylic acids ethylenically unsaturated in the $\alpha,\beta$-position and having 3 and 4 carbon atoms, including the imide of maleic acid; N-methylol derivatives of carboxylic acids ethylenically unsaturated in the $\alpha,\beta$-position that contain not more than 1 N-methylol group per carboxylic amide group, including the N-methylol group per carboxylic amide group, including the N-methylol imide of maleic acid; alkyl ether of these N-methylol derivatives that have 1 to 6 carbon atoms in the alkyl groups which are attached only to the oxygen atoms of the ether; and the N-hydroxyethyl monoamide of maleic acid are suitable. Furthermore, acrylamido and methacrylamido methylene ureas may be employed. Examples of such polymerizable ethylenically unsaturated carboxylic amides and their derivatives are acrylamide, methacrylamide and crotonamide, the mono and diamides of maleic acid, the mono and diamides of fumaric acid, the imide of maleic acid, N-methylol acrylamide, acrylamido-N-methylene urea, methacrylamido-N-methylene urea, N-methylol methacrylamide, N-methylol crontonamide, the N-methylol amide of maleic acid, the N-methylol diamide of maleic acid, the N,N'-dimethylol diamide of maleic acid, the N-methylol monoamide of fumaric acid, the N,N'-dimethylol diamide of fumaric acid, the N-methylol monoamide of itaconic acid, the N,N'-dimethylol diamide of itaconic acid, the N-methylol imide of maleic acid, and the methyl, ethyl, propyl, isopropyl, butyl tert. butyl, pentyl, and hexyl, ethers of the said methylol compounds. Furthermore, other derivatives of the said N-methylol compounds, e.g., their esters, are suitable. Such polymerizable carboxylic amides and their derivatives of the type mentioned can easily be produced by the conventional and well-known methods.

The amount of such carboxylic amides in the copolymers formed should be at least 1 percent by weight. Additionally to carboxylic amides of this type, other polymerizable ethylenically unsaturated compounds such as vinyl and vinylidene compounds, in particular the acrylates and methacrylates of straight-chain and branched alkanols with 1 to 8 carbon atoms, e.g., of methyl, ethyl, butyl, isobutyl, hexyl, and 2-ethyl-hexyl alcohol; vinyl esters, in particular of saturated aliphatic carboxylic acids with 2 or 3 carbon atoms, such as vinyl acetate and vinyl propionate; the dialkyl esters of $\alpha,\beta$-unsaturated dicarboxylic acids with 4 or5 carbon atoms with straight-chain and branched alkanols having 1 to 4 carbon atoms such as the methyl, ethyl, and butyl esters of maleic, fumaric and itaconic acids; and in special cases also small amounts of vinyl and vinylidene halides such as vinyl and vinylidene chloride, and vinyl aromatic compounds such as styrene may be employed. The amount of ethylenically unsaturated compounds forming an integral part of the copolymer can be up to 50 parts by weight and may consist only of ethylenically usaturated and if desired substituted carboxylic amides of the type mentioned. Preferably the copolymers contain, in copolymerized form, 1 to 50 parts by weight of ethylenically unsaturated carboxylic amides or their derivatives, i.e., N-methylol derivatives or ethers of N-methylol derivatives, because such copolymers have particularly good properties.

Suitable radical-forming catalysts are for instance organic peroxides such as benzoyl peroxide, lauroyl peroxide, di-tert. butyl peroxide, tert. butyl peroxide, tert. butyl perbenzoate, tert. butyl hydroperoxide and nitriles of azo-bis-carboxylic acids such as $\alpha,\alpha'$-azo-bis-isobutyro-bis-carboxylic acids such as $\alpha,\alpha'$-azo-bis-isobutyric acid, and amides of azo-bis-carboxylic acids such as $\alpha,\alpha'$-azo-bis-iso-$\alpha,\gamma$-dimethyl valeronitrile, esters of azo-bis- carboxylic acids such as methyl-$\alpha,\alpha'$-azo-bis-isobutryrate, azo-bis-carboxylic acids such as $\alpha,\alpha'$-azo-bis-isobutyric acid, and amides of azo-bis-carboxylic acids such as $\alpha,\alpha'$-azo-bis-isobutyramide. They are employed in the usual amounts, in general between 0.01 and 5, and preferably between 0.1 and 2 parts by weight calculated on the amount of monomers being polymerized. Particularly suitable are mixtures of azo compounds and organic peroxides of the type mentioned. If mixtures of such catalysts are employed, the relative proportions can be varied within wide limits, in general between a ratio of azo compound to organic peroxide of between 1:200 and 10:1. The azo compounds and organic peroxides may also be added to the vinyl compounds in the polymerization zone separately and if desired heated.

In certain cases the process may be carried out in the absence of solvents. Preferably, however, solvents for the ethylenically unsaturated compounds are employed, and this is generally necessary for carrying out the process on a commercial scale. Suitable solvents are for instance alcohols such as methanol, ethanol, propanol, isopropanol, tert. butanol, glycol, and their esters with carboxylic acids containing 2 to 4 carbon atoms such as ethyl acetate, ethers such as diisobutyl ether, isoamyl ether, tetrahydrofuran, dioxan, glycol monomethyl ether, glycol monoethyl ether, monoethers of di and triethylene glycol, aliphatic ketones such as acetone and methyl ethyl ketone, and aliphatic, cycloaliphatic, and aromatic hydrocarbons preferably with boiling points between 35 and 200° C. such as pentane, hexane, octane, isooctane, cyclohexane, methylcyclohexane, benzene, dimethyl cyclohexane, toluene, xylene, ethyl benzene, and isopropyl benzene. Particularly suitable solvents are methanol, ethanol, hexane, cyclohexane, and benzene. Water in amounts of up to 25 parts by weight calculated on the total amount of solvent may also be employed. In general 5 to 90 and preferably 10 to 60 parts by weight of such solvents calculated on the weight of the solution can be employed.

The process according to the invention is carried out at elevated pressure, generally at pressures between 50 and 600, preferably between 150 and 300, atmospheres. In special cases it is also possible to work at pressures below 50 or above 600 atmospheres. Pressures under 50 and over 600 atmospheres are, however, not of interest for reasons of process economics.

It is important in this process that the mixture of polymerizable ethylenically unsaturated compound and catalyst should form a thin layer in the polymerization zone. In this way it is possible quickly to bring sufficient ethylene into contact with the ethylenically unsaturated compound. By "thin" in this context is to be understood a layer thickness from 0.1 to 5 mm. Such thin layers or films form particularly easily if solutions of the nongaseous, ethylenically unsaturated polymerizable compounds, which may also contain catalysts and any polymer formed, flow over the inner surfaces of tubes or over the surfaces of packing elements. Thus, in general, equipment with a large internal surface in relation to the reaction space is particularly suitable for the process. The ratio of internal surface to reaction space is generally between 0.01 and 1.0 $m.^2$ per liter reaction space, and equipment in which this ratio lies between 0.25 and 0.8 $m.^2$ per liter reaction space is preferred for the process. By "reaction space" is understood the free volume of the apparatus without taking into account the volume of any packing in the reaction space, and "internal surface" signifies the sum of the surfaces of the internal walls of the apparatus and of the surfaces of any packing elements in the apparatus. If the ratio of internal surface to reaction space is above 1 $m.^2$ internal surface per liter reaction space, the flow resistance and thus the average residence time of the reaction mixture in the apparatus is too great, and the economy of the process thus suffers. If this ratio is smaller than 0.1 $m.^2$ internal surface per liter reaction space, the average residence time of the reaction mixture in the apparatus is too short, and the amount of material polymerized is unsatisfactory. As equipment of this type, trickle-type and coil-type reactors are particularly suitable. By "trickle-type reactor" we understand a reactor consisting of a pressure-resistant heatable vessel with inlet and outlet pipes, and containing packing elements such as Raschig rings or, preferably, spheres or link chains. The container may be fully or partially filled with such packing elements. Furthermore the packing elements in the container may be arranged on a multiplicity of perforated trays or sieve plates. By the term "coil-type reactor" we understand a pressure-resistant, heatable, tubular reactor consisting of one or several tubes. The tubes may be in spiral or zig-zag shape as shown in the drawing. Trickle-type reactors are particularly suitable for this process. The process can in some cases be carried out with advantage in a plurality of such reactors arranged in series. The ethylenically unsaturated compounds are added continuously, if desired preheated and mixed with catalyst and solvent. It is also possible, however, to add a solution of ethylenically unsaturated compounds, and separately therefrom, if desired at a plurality of points, the catalyst. The reaction mixture, which at the end of the polymerization vessel in general does not contain any unreacted and non-gaseous ethylenically unsaturated compounds, can be removed continuously. It is very advantageous, particularly if a trickle-type reactor or coil-type reactor is being employed, to remove the reaction mixture from the reactor periodically with a sudden reduction in pressure. A valve at the end of the reactor is generally kept closed for about 10 to 120 seconds and then opened for about 0.5 to 10 seconds. In this periodical removal of the reaction mixture in general 0.2 to 10% of the reaction mixture is removed from the reactor. After the polymer has been removed from the reactor, any solvent which has been added may be separated in the usual way, for example by distillation.

According to this process copolymers are obtained which are practically free from homopolymers or cross-linked polymers. They can, however, be cross-linked via their reactive groups. The copolymers of ethylene with 1 to 50 percent by weight of carboxylic amides ethylenically unsaturated in the $\alpha,\beta$-position, or their derivatives and, if desired, additionally with other polymerizable ethylenically unsaturated compounds which are non-gaseous under the reaction conditions, have K values of 10 to 45. Copolymers of 99 to 50 percent by weight ethylene and 1 to 50 percent by weight ethylene and 1 to 50 percent by weight N-methylol derivatives of carboxylic acids ethylenically unsaturated in the $\alpha,\beta$-position and having 3 and 4 carbon atoms, including the N-methylol imide of maleic acid, alkyl ethers of these methylol derivatives and/or the monoamide of N-hydroxyethyl maleic acid are new and have K values of 15 to 45.

In general the copolymers produced by this method are waxy and may be readily emulsified in water to form relatively stable emulsions by adding conventional emulsifying agents such as morpholine oleate, isopropanolamine oleate, and arylsulfonates. They can be mixed with other synthetic or natural macromolecular compounds and additives such as polyethylene, polyacrylates, polyvinyl chloride, polyesters, polyamides, polystyrene, polyvinyl esters, or also with copolymers such as ethylene/vinyl acetate copolymers containing 10 to 90 parts by weight vinyl acetate in polymerized form, and also with synthetic and natural rubber and with cellulose products. They are particularly suitable for paper conversion and textile finishing and may also in some cases be employed in the production of surface coating materials.

The parts and percentages given in the Examples are by weight. The K values were measured according to H. Fikentscher, Cellulosechem., 13, 58 (1932) in decahydronaphthalene at 130° C. The penetration numbers given in the Examples were determined according to ASTM designation D217/48 using a penetrometer.

*Example 1*

To a trickle-type reactor which is packed with Raschig rings and is under an ethylene pressure of 300 atmospheres a solution of 50 parts acrylamide, 10 parts di-tert. butyl peroxide and 1 part azo-bis-isobutyronitrile in 20,000 parts methanol is fed per hour continuously. The temperature in the reactor is maintained at 125° C. At the end of the reactor the reaction mixture is removed continuously. The ratio of internal surface to reaction space in the reactor is 0.8 $m.^2$ per liter. The average residence time in the reactor is 10 minutes. 1500 parts per hour of a hard copolymer containing 3 percent by weight of acrylamide in copolymerized form is obtained. The K value of the copolymer is 19 and its penetration number 4.

If, instead of 10 parts di-tert. butyl peroxide, 10 parts lauroyl peroxide is employed, and the temperature in the reactor is maintained at 65° C., but the other conditions are identical with those above, 1200 parts per hour of an ethylene copolymer containing 4 percent acrylamide in copolymerized form is obtained. The copolymer has a K value of 29 and its penetration number is 8. Both copolymers may be emulsified in water. Aqueous emulsions prepared therefrom are suitable for converting paper and as additives for floor polishes.

*Example 2*

(A) To a coil-type reactor, in which the ratio of internal surface to reaction space is 0.25 $m.^2$ per liter, and which is under an ethylene pressure of 300 atmospheres, a solution of 40 parts N-methylol methacrylamide and 10 parts di-tert. butyl peroxide in 15,060 parts methanol is fed per hour continuously. The temperature of the reactor is maintained at 130° C., and the outlet valve is opened at intervals of 25 seconds for periods of 5 seconds. 1000 parts per hour of an ethylene copolymer containing 4% N-methylol methacrylamide in copolymerized form is obtained. The copolymer has a K value of 23 and a penetration number of 5.5.

(B) If the N-methylol methacrylamide is fed to the reactor dissolved in 10,000 parts methanol, and separately therefrom a solution, heated to 60° C., of di-tert. butyl peroxide in 5000 parts methanol is added, and if the other conditions are identical with those above, 1500 parts per hour of an ethylene copolymer containing 2.5% N-methylol methacrylamide in copolymerized form is obtained. The copolymer has a K value of 22 and a penetration number of 7.

(C) If the process described under (A) is used, but instead of 10 parts only 9 parts di-tert. butyl peroxide is employed and separately therefrom a solution of 1 part azo-bis-isobutyronitrile in 1000 parts methanol is added, 1960 parts per hour of an ethylene copolymer containing 1.9% N-methylol methacrylamide in copolymerized form is obtained. The copolymer has a K value of 23 and a penetration number of 5.

*Example 3*

Into a trickle-type reactor which is packed with a link chain and which has a ratio of internal surface to reaction space of 0.6 $m.^2$ per liter and which is under an ethylene pressure of 300 atmospheres, 9100 parts per hour of a solution of 75 parts N-methylol methacrylamide in a mixture of 9000 parts methanol and 25 parts toluene is injected, and separately therefrom a solution, heated to 50° C., of 10 parts di-tert. butyl peroxide in 1 part azo-bis-isobutyronitrile in 1000 parts methanol is added. The temperature in the reactor is maintained at 120° C. and the polymer is removed periodically. To do this the outlet valve is kept closed for periods of 20 seconds and opened for periods of 3 seconds. 2000 parts per hour of a hard colorless ethylene copolymer, containing about 3.7% N-methylol methacrylamide in copolymerized form is obtained. The copolymer has a K value of 21 and melts at about 90° C.; at 130° C. its viscosity is 450 cps.

If 600 parts N-methylol methacrylamide per hour is brought into the reactor and the other conditions are identical with those above, an ethylene copolymer containing 20.5% by weight N-methylol methacrylamide in copolymerized form is obtained. The copolymer has a K value of 31 and a melting point of approximately 87° C.

Both copolymers are suitable, for instance, for providing crease-resist finishes on cotton fabrics.

*Example 4*

To a high-pressure trickle-type reactor which contains a link chain as packing and which has a ratio of internal surface to reaction space of 0.6 $m.^2$ per liter and is under an ethylene pressure of 280 atmospheres, a solution of 200 parts N-methylol methacrylamide butyl ether in 7000 parts cyclohexane is fed per hour, and separately therefrom a solution heated to 60° C. of 9 parts di-tert. butyl peroxide and 3 parts azo-bis-isobutyronitrile in 3000 parts cyclohexane is added per hour. The temperature in the reactor is maintained at 125° C. The outlet valve is kept closed for periods of 35 seconds and opened for periods of 7 seconds. After the cyclohexane has been separated by distillation, 2200 parts per hour of an ethylene copolymer containing 9.1% N-methylol methacrylamide butyl ether in copolymerized form is obtained. The copolymer has a K value of 17 and melts at about 70° C.

If all other conditions are identical with those above, but instead of 20 parts per hour 500 parts (900 parts) per hour N-methylol methacrylamide butyl ether is added, only 1950 (1960) parts per hour of an ethylene copolymer containing 25.2 (46) % N-methylol methacrylamide butyl ether in copolymerized form is obtained. The K value of the copolymer is 21 (18) and its melting point about 85° C. (83° C.).

The copolymers are suitable for the finishing of textile materials.

*Example 5*

To a trickle-type reactor which is under an ethylene pressure of 200 atmospheres and contains a link chain as packing, and in which the ratio of internal surface to reaction space is 0.6 $m.^2$ per liter, a solution of 150 parts methacrylamide in 9000 parts n-butanol is fed per hour and separately therefrom a solution heated to 50° C. of 10 parts di-tert. butyl peroxide and 1 part azo-bis-isobutyronitrile in 1000 parts butanol is added per hour. The temperature in the reactor is maintained at 120° C. 1250 parts per hour of an ethylene copolymer containing 12% methacrylamide in copolymerized form is obtained. The copolymer has a K value of 23 and a melting point of approximately 75° C.

If the methacrylamide is replaced by crotonamide, but the other conditions are identical with those above, 980 parts per hour of an ethylene copolymer containing 14.6% crotonamide in copolymerized form is obtained. The copolymer has a K value of 19 and a melting range of 82 to 89° C.

If instead of methacrylamide, the imide of maleic acid is employed but the other conditions are identical with those above, 1060 parts per hour of an ethylene copolymer containing 12.9% of the imide of maleic acid in copolymerized form is obtained. The copolymer has a K value of 29 and a melting point of approximately 95° C.

*Example 6*

To a coil-type reactor which is under an ethylene pressure of 150 atmospheres and which has a ratio of internal surface to reaction space of 0.157 $m.^2$ per liter, a solution of 100 parts acrylamide and 10 parts methyl acrylate in 10,000 parts of a mixture of equal parts methanol and cyclohexane is fed per hour and separately therefrom a solution heated to 45° to 50° C. of 2.5 parts tert. butyl perbenzoate and 10 parts azo-bis-isobutyronitrile in a mixture of 5000 parts methanol and 2 parts dimethyl phthalate is added per hour. The polymerization mixture is removed from the coil reactor periodically. The outlet valve remains closed for periods of 60 seconds and open for periods of 3 seconds. The temperature in the reactor is maintained at 100° C. 1500 parts per hour of a solid ethylene copolymer containing 6.6% acrylamide and 0.6% methyl acrylate in copolymerized form is obtained. The K value of the copolymer is 30, its melt viscosity at 130° C. is 800 cps., and its melting point approximately 78° to 81° C.

If instead of the acrylamide methacrylamide is used, and instead of the methyl acrylate 5 parts vinyl acetate, but the other conditions are identical with those above, an ethylene copolymer containing 6.5% methacrylamide and 0.3% vinyl acetate in copolymerized form is obtained. The copolymer has a melt viscosity of 600 cps. at 130° C. and a K value of 39.

*Example 7*

To a trickle-type reactor which contains stainless steel rods as packing and which has a ratio of internal surface to reaction space of 0.52 m.$^2$ per liter and is under an ethylene pressure of 60 atmospheres, a solution of 150 parts N-methylol methacrylamide and 10 parts ethyl acrylate in a mixture of 15,000 parts cyclohexane and 50 parts toluene is fed per hour, and separately therefrom a solution heated to 50° C. of 50 parts lauroyl peroxide and 3 parts azo-bis-isobutyronitrile in a mixture of 5000 parts methanol and 2000 parts benzene is added per hour. The temperature in the trickle-type reactor is 80° C. 1000 parts per hour of an ethylene copolymer containing 15% N-methylol acrylamide and 1% ethyl acrylate in copolymerized form is obtained. The copolymer melts at about 73° to 76° C., has a K value of 34, and a melt viscosity of 560 cps. at 130° C.

The copolymer is suitable as an additive for surface coating materials.

*Example 8*

To a coil-type reactor having a ratio of internal surface to reaction space of 0.25 m.$^2$ per liter, and which is under an ethylene pressure of 600 atmospheres, a solution of 250 parts N-methylol acrylamide methyl ether in 10,000 parts benzene is fed per hour continuously, and separately therefrom a solution of 1 part azo-bis-isobutyronitrile and 10 parts di-tert. butyl peroxide in 5000 parts benzene. The temperature in the reactor is 120° C. 2900 parts per hour of an ethylene copolymer containing 8.5% N-methylol acrylamide methyl ether in copolymerized form is obtained.

The copolymer melts at 92° to 108° C. and has a K value of 41.

*Example 9*

To a trickle-type reactor which is filled with Raschig rings and which has a ratio of internal surface to reaction space of 0.7 m.$^2$ per liter and which is under an ethylene pressure of 300 atmospheres, a solution of 500 parts N-methylol acrylamide ethyl ether in 10,000 parts methanol is fed per hour continuously, and separately therefrom a solution of 1 part lauroyl peroxide and 10 parts di-tert. butyl peroxide in 2500 parts methanol. The temperature in the reactor is 115° C. 2150 parts per hour of a colorless copolymer containing 23% N-methylol acrylamide ethyl ether in copolymerized form is obtained.

The copolymer has a K value of 27 and melts at 85° to 92° C.

*Example 10*

To a trickle-type reactor which is filled with spheres and which has a ratio of internal surface to reaction space of 0.5 m.$^2$ per liter and is under an ethylene pressure of 200 atmospheres, 10,000 parts per hour of a solution of 100 parts N-methylol acrylamide hexyl ether in a mixture of 9000 parts methanol and 400 parts toluene is fed, and separately therefrom a solution heated to 50° C. of 10 parts di-tert. butyl peroxide and 1 part lauroyl peroxide in 1000 parts methanol. The temperature in the reactor is maintained at 125° to 130° C. and the polymer is removed periodically. To achieve this the outlet valve is kept closed for periods of 30 seconds and open for periods of 5 seconds. 1730 parts per hour of a colorless ethylene copolymer containing approximately 5.7% N-methylol acrylamide hexyl ether in copolymerized form is obtained.

The copolymer has a K value of 19 and melts at 85° to 90° C.

If additionally 300 parts acrylamide per hour is fed to the reactor, 2050 parts of a copolymer containing approximately 4.7% N-methylol acrylamide hexyl ether and 14.5% acrylamide in copolymerized form are obtained.

The copolymer has a K value of 26 and melts at approximately 96° C.

*Example 11*

(A) To a high-pressure trickle-type reactor which contain Raschig rings as packing, has a ratio of internal surface to reaction space of 0.78 m.$^2$ per liter and is under an ethylene pressure of 325 atmospheres, a solution of 300 parts of the ammonium salt of the monoamide of maleic acid in 7000 parts methanol is fed per hour and separately therefrom a solution heated to 80° of 15 parts di-tert. butyl peroxide in 3000 parts methanol. The temperature in the reactor is 120° C. The reaction mixture is removed from the reactor periodically.

The outlet valve of the reactor is closed for periods of 20 seconds and open for periods of 3 seconds.

After the methanol has been separated from the reaction mixture by distillation, 2050 parts per hour of an ethylene copolymer containing 14.5% of the ammonium salt of the monoamide of maleic acid in copolymerized form is obtained.

The copolymer has a K value of 19 and melts at 78° to 83° C.

(B) If instead of the ammonium salt of the monoamide of maleic acid 300 parts of the N,N'-dimethylol diamide of maleic acid is fed to the reactor, but the other conditions are identical with those under (A), 2430 parts per hour of an ethylene copolymer containing approximately 12% of the di-(N-methylol) diamide of maleic acid in copolymerized form is obtained. The copolymer has a K value of 22 and a melting point of approximately 81° to 85° C.

(C) If, instead of the ammonium salt of the monoamide of maleic acid 300 parts of the N,N'-dimethylol diamide of fumaric acid is fed to the reactor, but the other conditions are identical with those under (A), 2180 parts per hour of a colorless ethylene copolymer containing approximately 13% of the N,N'-methylol diamide of fumaric acid in copolymerized form is obtained. The copolymer has a K valve of 20.5 and a melting range of 78° to 82° C.

(D) If instead of the ammonium salt of the monoamide of maleic acid 300 parts of the N-hydroxyethyl monoamide of maleic acid is fed to the reactor, but the other conditions are identical with those under (A), 1960 parts per hour of an ethylene copolymer containing 15% of the N-hydroxyethyl monoamide of maleic acid in copolymerized form is obtained.

The copolymer has a K value of 17 and melts at approximately 75° C.

The copolymers are particularly suitable for paper conversion.

*Example 12*

To a trickle-type reactor which is packed with a link chain and which has a ratio of inner surface to reaction space of 0.6 m.$^2$ per liter and is under an ethylene pressure of 300 atmospheres, a solution of 100 parts acrylamide in 10,000 parts methanol is fed per hour, and separately therefrom a solution of 10 parts tert. butyl perbenzoate and 1 part lauroyl peroxide in 1000 parts benzene. The temperature in the reactor is maintained at 105° C. 1300 parts per hour of a colorless ethylene copolymer containing 7.5% acrylamide in copolymerized form is obtained.

The copolymer has a K value of 24.5 and a melting point of approximately 86° C.

If additionally 300 parts methyl acrylate per hour is fed in, 1560 parts per hour of a colorless ethylene copolymer containing 6.4% acrylamide and 19% methyl acrylate in copolymerized form is obtained.

The copolymer has a K value of 28.5 and a melting point of approximately 79° C.

If additionally instead of the methyl acrylate 300 parts diethyl maleate per hour is fed in, 1430 parts of an ethylene copolymer containing approximately 7% acrylamide and approximately 21% diethyl maleate in copolymerized form is obtained. The copolymer has a K value of 21 and a melting range of 75° to 82° C.

*Example 13*

Into a trickle-type reactor which is packed with a link chain, has a ratio of internal surface to reaction space of 0.6 $m.^2$ per liter and is under an ethylene pressure of 300 atmospheres, a mixture of 350 parts methacrylamide, 10 parts of a 30% aqueous ammonia solution, 55 parts trioxan and 9000 parts n-butanol is fed per hour, and separately therefrom a solution heated to 45° C. of 15 parts di-tert. butyl peroxide and 2 parts azo-bis-isobutyronitrile in 1000 parts n-butanol. The temperature in the reactor is maintained at 115° C. Under these reaction conditions N-methyl methacrylamide-n-butyl ether is formed from the methacrylamide, trioxan and n-butanol in the reaction mixture.

1900 parts per hour of an ethylene copolymer containing approximately 7.9% methacrylamide and approximately 15.5% N-methylol methacrylamide butyl ether in copolymerized form is obtained.

The copolymer has a K value of 29 and a melting range of 76° to 84° C.

The copolymer is suitable for use as an additive to surface coating materials.

What we claim is:

1. In a process for the production of copolymers of ethylene having a K value measured in decahydronaphthalene at 130° C. of from 15 to 45 by copolymerizing ethylene with 1 to 50% by weight of polymerizable ethylenically unsaturated carboxylic amides at temperatures of from 50° to 200° C. and pressures of from 50 to 600 atmospheres in the presence of free radical forming catalysts and solvents, the improvement which comprises reacting the ethylene with a thin layer containing catalyst, solvent and a polymerizable ethylenically unsaturated carboxylic amide dissolved in the said solvent and selected from the group consisting of amides of carboxylic acids ethylenically unsaturated in $\alpha,\beta$-position and having 3 and 4 carbon atoms, maleic acid imide, N-methylol derivatives of amides of carboxylic acids ethylenically unsaturated in $\alpha,\beta$-position and having 3 and 4 carbon atoms, N-methylol maleic acid imide, said N-methylol derivatives containing not more than one combined N-methylol group per carboxylic amide group, alkyl ethers of said N-methylol derivatives containing from 1 to 6 carbon atoms in those alkyl groups which are only bound to the oxygen atom of the ethers, and N-hydroxyethyl maleic acid monoamide, said thin layer having a thickness of from 0.1 to 5 mm.

2. Copolymers consisting essentially of from 99 to 50% by weight of ethylene comonomer and 1 to 50% by weight of a polymerizable carboxylic amide comonomer selected from the group consisting of N-methylol derivatives of amides of carboxylic acids ethylenically unsaturated in $\alpha,\beta$-position and having 3 and 4 carbon atoms, N-methylol maleic acid imide, said N-methylol derivatives containing not more than one combined N-methylol group per carboxylic amide group, alkyl ethers of said N-methylol derivatives containing from 1 to 6 carbon atoms in those alkyl groups which are only bound to the oxygen atoms of the ethers, and N-hydroxyethyl maleic acid monoamide, said copolymers having a K value of from 15 to 45 measured in decahydronaphthalene at 130° C.

3. In a process for the production of copolymers of ethylene having a K-value of from 15 to 45 measured in decahydronaphthalene at 130° C. by copolymerizing ethylene with up to 50% by weight of polymerizable ethylenically unsaturated carboxylic amides at temperatures of from 50° C. to 200° C., and a pressure of from 50 to 600 atmospheres in the presence of free radical forming catalysts and solvents, the improvement which comprises: reacting the ethylene with a thin layer containing catalyst, solvent and a polymerizable ethylenically unsaturated carboxylic amide dissolved in said solvent and selected from the group consisting of amides of carboxylic acids ethylenically unsaturated in $\alpha,\beta$-position and having 3 and 4 carbon atoms, maleic acid imide, N-methylol derivatives of amides of carboxylic acids ethylenically unsaturated in $\alpha,\beta$-position and having 3 and 4 carbon atoms, N-methylol maleic acid imide, said N-methylol derivatives containing not more than one combined N-methylol group per carboxylic amide group, alkyl ethers of said N-methylol derivatives containing from 1 to 6 carbon atoms in those alkyl groups which are only bound to the oxygen atom of the ethers, and N-hydroxyethyl maleic acid monoamide, and removing 0.2 to 10% of the reaction mixture periodically with a sudden reduction of pressure from the reaction vessel, said thin layer having a thickness of from 0.1 to 5 mm.

References Cited by the Examiner

UNITED STATES PATENTS 2,301,356 11/1942 Arnold et al. -------- 260—78
2,996,488 8/1961 Mital et al. -------- 260—88.1

FOREIGN PATENTS 614,624 12/1948 Great Britain.

WILLIAM H. SHORT, *Primary Examiner.*
H. D. ANDERSON, *Assistant Examiner.*

UNITED STATES PATENT OFFICE
CERTIFICATE OF CORRECTION

Patent No. 3,294,754 December 27, 1966

Herbert Naarmann et al.

It is hereby certified that error appears in the above numbered patent requiring correction and that the said Letters Patent should read as corrected below.

Column 1, line 24, for "by" read -- be --; line 43, for "properies" read -- properties --; lines 67 and 68, strike out "including the N-methylol group per carboxylic amide group," column 2, line 45, for "usaturated" read -- unsaturated --; sam column 2, lines 57 and 58, strike out "bis-carboxylic acids suc as α,α′-azo-bis-isobutyric acid, and amides of azo-bis-carboxylic acid such as α,α′-azo-" and insert instead -- nitril the nitrile of α,α′-azo-bis-cyclohexane, α,α′-azo- --.

Signed and sealed this 24th day of October 1967.

(SEAL)
Attest:

EDWARD M. FLETCHER, JR.
Attesting Officer

EDWARD J. BRENNER
Commissioner of Patents